(12) United States Patent
Kim et al.

(10) Patent No.: US 10,272,738 B1
(45) Date of Patent: Apr. 30, 2019

(54) METHOD OF CONTROLLING AIR CONDITIONING SYSTEM FOR VEHICLE

(71) Applicants: Hyundai Motor Company, Seoul (KR); Kia Motors Corporation, Seoul (KR)

(72) Inventors: Jae Yeon Kim, Gyeonggi-do (KR); Wan Je Cho, Gyeonggi-do (KR); Yong Hyun Choi, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 23 days.

(21) Appl. No.: 15/812,144

(22) Filed: Nov. 14, 2017

(30) Foreign Application Priority Data

Oct. 12, 2017 (KR) .................. 10-2017-0132555

(51) Int. Cl.
*B60H 1/00* (2006.01)
*B60H 1/22* (2006.01)

(52) U.S. Cl.
CPC ..... *B60H 1/00764* (2013.01); *B60H 1/00392* (2013.01); *B60H 1/00985* (2013.01); *B60H 1/2218* (2013.01); *B60H 2001/00949* (2013.01); *B60H 2001/00992* (2013.01); *B60H 2001/224* (2013.01); *B60H 2001/2234* (2013.01); *B60H 2001/2253* (2013.01); *B60H 2001/2256* (2013.01); *B60H 2001/2262* (2013.01)

(58) Field of Classification Search
CPC .............. B60H 1/00764; B60H 1/2218; B60H 1/00392; B60H 1/00985; B60H 1/2001; B60H 1/2234; B60H 1/2256; B60H 1/00949; B60H 1/00992; B60H 1/2253; B60H 1/224; B60H 1/2262
See application file for complete search history.

(56) References Cited

U.S. PATENT DOCUMENTS

| 9,688,114 | B2 * | 6/2017 | Sakai | B60H 1/00385 |
| 2010/0274394 | A1 * | 10/2010 | Wijaya | B60H 1/00735 700/276 |
| 2014/0114515 | A1 * | 4/2014 | Porras | B60H 1/00385 701/22 |
| 2015/0283878 | A1 * | 10/2015 | Rose | B60H 1/00735 701/36 |

FOREIGN PATENT DOCUMENTS

| JP | 5369953 B2 | 12/2013 |
| JP | 2016-138715 A | 8/2016 |
| KR | 10-1610843 | 4/2016 |

* cited by examiner

*Primary Examiner* — Michael J Zanelli
(74) *Attorney, Agent, or Firm* — Mintz Levin Cohn Ferris Glovsky and Popeo, P.C.; Peter F. Corless

(57) ABSTRACT

A method of controlling an air conditioning system for a vehicle enables a user to recognize whether economical heating is available, while a vehicle travels. The method includes: (A) when starting of the vehicle is in an on state, confirming a heating condition and a waste heat source state while the vehicle travels, and predicting power consumption of an electric heater; and (B) comparing a power consumption reference value of the electric heater with a power consumption prediction value of the electric heater, displaying that economical heating is available or unavailable on the display unit, determining whether to turn off the starting of the vehicle, and terminating a control.

11 Claims, 2 Drawing Sheets

METHOD OF CONTROLLING AIR CONDITIONING SYSTEM FOR VEHICLE

CROSS-REFERENCE TO RELATED APPLICATION

This application claims under 35 U.S.C. § 119(a) the benefit of Korean Patent Application No. 10-2017-0132555 filed in the Korean Intellectual Property Office on Oct. 12, 2017, the entire contents of which are incorporated herein by reference.

BACKGROUND

(a) Technical Field

The present disclosure relates to a method of controlling an air conditioning system for a vehicle, and more particularly, to a method of controlling an air conditioning system that predicts and determines a waste heat source state and power consumption of an electric heater in real time before or during operation of a heating mode of the vehicle (i.e., an electric vehicle) to enable a user to recognize whether economical heating is available.

(b) Description of the Related Art

In general, an air conditioning apparatus for a vehicle includes an air conditioning system which circulates a refrigerant for heating or cooling an interior of the vehicle.

The air conditioning system maintains an interior temperature of the vehicle at an appropriate temperature regardless of a change in an outside temperature and maintains a pleasant interior environment, and is configured to heat or cool the interior of the vehicle by heat exchange using an evaporator in a process in which a refrigerant discharged by driving of a compressor passes through a condenser, a receiver drier, an expansion valve, and the evaporator and is then circulated to the compressor again.

With an increased emphasis on energy efficiency and avoiding environmental contamination, there has been a need to develop an environmentally-friendly vehicle that is substantially capable of replacing an internal-combustion engine vehicle, and the environmentally-friendly vehicle is commonly divided into an electric vehicle that is driven by using a fuel cell or electricity as a power source and a hybrid vehicle that is driven by using an engine and an electric battery.

The air conditioning apparatus, which is applied to an environmentally-friendly vehicle, such as an electric vehicle or a hybrid vehicle, is generally referred to as a heat pump system.

In the meantime, the electric vehicle converts chemical reaction energy of oxygen and hydrogen into electric energy to generate driving power, and in this process, heat energy is generated by the chemical reaction within a fuel cell, so that it is essential to effectively remove the generated heat for securing a performance of the fuel cell.

Further, the hybrid vehicle generates driving power by driving a motor by using electricity supplied from the fuel cell or an electric battery together with an engine operated by using general fuel, so that only when heat generated from the fuel cell, the battery, and the motor is effectively removed, a performance of the motor may be secured.

However, in the air conditioning system that is the heat pump system in the related art, when a user operates a heating mode, power and waste heat of the engine are not provided. Accordingly, in order to heat an interior of the vehicle at a required temperature of the user, an electric heater operated according to a supply of power may be excessively used.

Further, use of the battery is increased due to the use of the electric heater, and a travelling distance of the vehicle is decreased.

Further, in order to increase a travelling distance, operation of the heating mode needs to be stopped, thereby degrading user convenience and marketability of a vehicle.

The above information disclosed in this Background section is only for enhancement of understanding of the background of the disclosure and therefore it may contain information that does not form the prior art that is already known in this country to a person of ordinary skill in the art.

SUMMARY

The present disclosure provides a method of controlling an air conditioning system for a vehicle, which predicts and determines a waste heat source state and power consumption of an electric heater in real time before or during operation of a heating mode of the vehicle (i.e., an electric vehicle) to enable a user to recognize whether economical heating is available. An exemplary embodiment of the present disclosure provides a method of controlling an air conditioning system for a vehicle, which enables a user to recognize whether economical heating is available, while a vehicle travels, the method including: (A) in a state where starting of the vehicle is in an on state, confirming, by a control unit, a heating condition and a waste heat source state while the vehicle travels, and predicting power consumption of an electric heater; and (B) comparing a power consumption reference value of the electric heater with a power consumption prediction value of the electric heater, displaying that economical heating is available or unavailable on a display unit, determining whether to turn off the starting of the vehicle, and terminating a control, which are performed by the control unit.

The operation (A) may include: turning on the starting of the vehicle and operating the vehicle; detecting, by the control unit, the heating condition which the user previously sets or newly sets, and detecting, by the control unit, a waste heat source state based on output signals output from an outside air temperature sensor, an interior temperature sensor, and an coolant temperature sensor; and predicting, by the control unit, power consumption of the electric heater according to the detected heating condition and waste heat source state.

In the predicting of, by the control unit, the power consumption of the electric heater according to the detected heating condition and waste heat source state, the control unit may predict the power consumption of the electric heater by using one or two or more waste heat sources among outside air, interior air, and a coolant for heating of the vehicle.

The operation (B) may include: determining of, by the control unit, whether the power consumption reference value of the electric heater is larger than the power consumption prediction value of the electric heater; in the determining of, by the control unit, whether the power consumption reference value of the electric heater is larger than the power consumption prediction value of the electric heater, when the power consumption reference value of the electric heater is larger than the power consumption prediction value of the electric heater, displaying, by the control unit, that economical heating is available on the display unit; and determining of, by the control unit, whether to turn off the starting of the vehicle.

The method may further include, in the determining of, by the control unit, whether the power consumption reference value of the electric heater is larger than the power consumption prediction value of the electric heater, when the power consumption reference value of the electric heater is not larger than the power consumption prediction value of the electric heater, displaying, by the control unit, that economical heating is available on the display unit.

The method may further include, after the displaying of, by the control unit, that economical heating is unavailable on the display unit is performed, determining, by the control unit, whether to turn off the starting of the vehicle again.

The method may further include, in the determining of, by the control unit, whether to turn off the starting of the vehicle, when it is determined to turn off the starting of the vehicle, terminating the control.

The method may further include, in the determining of, by the control unit, whether to turn off the starting of the vehicle, when it is determined not to turn off the starting of the vehicle, returning to the detecting of, by the control unit, the heating condition which the user previously sets or newly sets, and the detecting of, by the control unit, the waste heat source state based on the output signals output from the outside air temperature sensor, the interior temperature sensor, and the coolant temperature sensor in the operation (A).

The display unit may be provided in a navigation or full automatic temperature control (FATC) panel mounted inside the vehicle.

When economical heating is available, the display unit may be illuminated with green light, and when economical heating is unavailable, the display unit may be illuminated with red light to enable the user to recognize whether the economical heating is available or unavailable.

As described above, according to the method of controlling the air conditioning system for the vehicle according to the exemplary embodiment of the present disclosure, the method predicts and determines a waste heat source state and power consumption of an electric heater in real time before or during operation of a heating mode of a vehicle in an electric vehicle to enable a user to recognize whether economical heating is available, thereby preventing excessive power consumption of the electric heater, and increasing an overall travelling distance of the vehicle through an efficient management of the battery.

Further, a user may confirm whether economical heating is available through a display unit in real time while a vehicle travels, thereby improving marketability of the vehicle.

Further, in the exemplary embodiment of the present disclosure, a waste heat source generated in a vehicle is detected and the waste heat source is selectively used for heating the interior of a vehicle, thereby efficiently implementing the air conditioning system.

Another exemplary embodiment of the present disclosure provides a non-transitory computer readable medium containing program instructions executed by a processor, including: program instructions that, in a state where starting of a vehicle is in an on state, confirm a heating condition and a waste heat source state while the vehicle travels, and predict power consumption of an electric heater; and program instructions that compare a power consumption reference value of the electric heater with a power consumption prediction value of the electric heater, display that economical heating is available or unavailable on the display unit, determine whether to turn off the starting of the vehicle, and terminate a control.

DETAILED DESCRIPTION OF THE EMBODIMENTS

Figure 1:
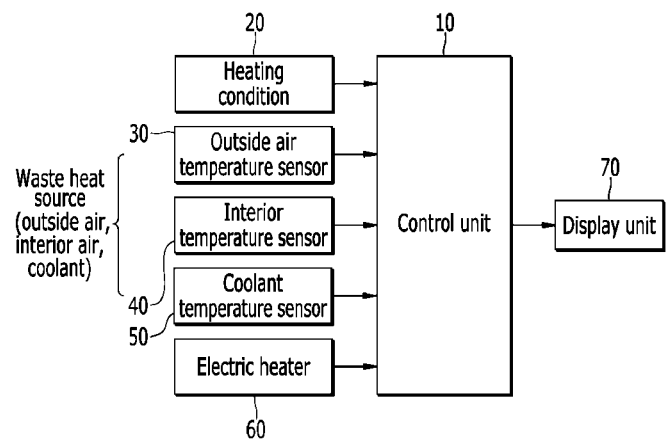
FIG. 1 is a control configuration diagram of a display unit to which a method of controlling an air conditioning system for a vehicle according to an exemplary embodiment of the present disclosure is applied.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

An exemplary embodiment of the present disclosure will hereinafter be described in detail with reference to the accompanying drawings.

The exemplary embodiment described in the present specification and the configuration illustrated in the drawings are simply the exemplary embodiments of the present disclosure, and do not represent all of the technical spirits of the present disclosure, and thus it should be understood that there are various equivalents and modification examples substitutable with the exemplary embodiment described in the present specification and the configuration illustrated in the drawing at the time of filing the present disclosure.

The drawings and description are to be regarded as illustrative in nature and not restrictive, and like reference numerals designate like elements throughout the specification.

Figure 2:
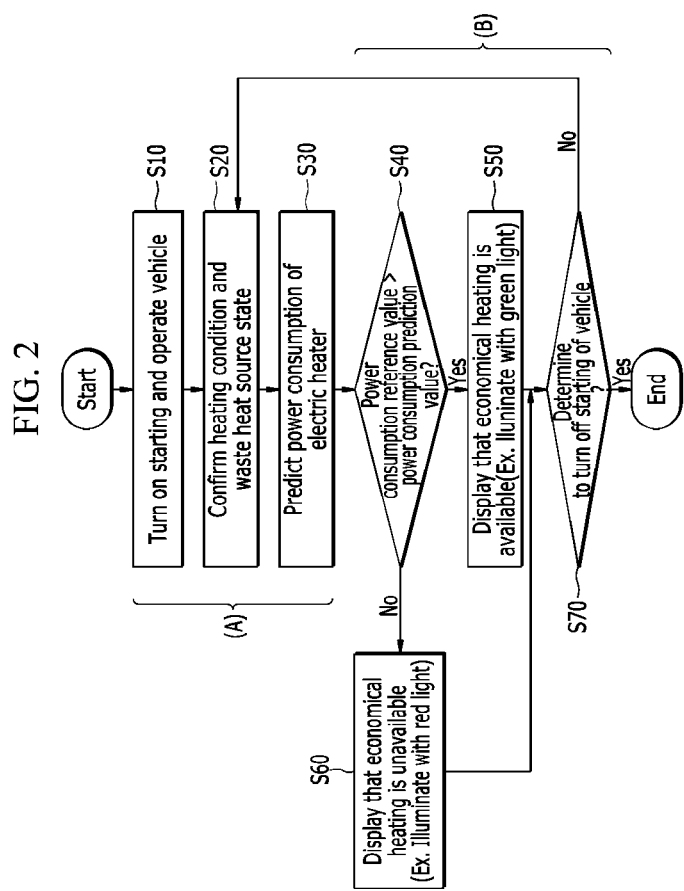
FIG. 2 is a control flow chart for describing the method of controlling the air conditioning system for the vehicle according to the exemplary embodiment of the present disclosure.

FIG. 1 is a control configuration diagram of a display unit to which a method of controlling an air conditioning system for a vehicle according to an exemplary embodiment of the present disclosure is applied, and FIG. 2 is a control flow chart for describing the method of controlling the air conditioning system for the vehicle according to the exemplary embodiment of the present disclosure.

Referring to FIG. 1, a method of controlling an air conditioning system for a vehicle according to an exemplary embodiment of the present disclosure is applicable to an electric vehicle.

In the electric vehicle, the method of controlling the air conditioning system for the vehicle according to the exemplary embodiment of the present disclosure predicts and determines a waste heat source state and power consumption of an electric heater in real time before or during operation of a heating mode of the vehicle, and enables a user to recognize whether economical heating is available through a display unit 70.

The display unit 70 may be provided in a navigation or full automatic temperature control (FATC) panel mounted inside the vehicle. Further, the display unit 70 may be selectively illuminated with green light or red light according to a control signal of a control unit 10.

That is, when economical heating is available, the display unit 70 is illuminated with the green light by the control signal of the control unit 10. In contrast, when economical heating is unavailable, the display unit 70 may be illuminated with the red light by the control signal of the control unit 10.

Accordingly, the user may recognize whether the economical heating is available or unavailable in a current travelling state based on the green or red light illuminated on the display unit 70.

Herein, as illustrated in FIG. 1, the control unit 10 may confirm a heating condition 20 which the user previously sets or newly sets, e.g., via a dashboard and/or touch screen display in the vehicle.

The heating condition may include an interior setting temperature, an outside air or inside air mode of the interior of the vehicle, and the like which are set by the user.

The control unit may be electrically connected with an outside air temperature sensor 30, an interior temperature sensor 40, and a coolant temperature sensor 50 so as to confirm an outside air temperature, an interior air temperature, and a coolant temperature serving as waste heat sources while the vehicle travels.

Further, the control unit 10 may be electrically connected with an electric heater 60 provided inside a heating, ventilation, and air conditioning (HVAC) module of the vehicle.

Herein, the electric heater 124 may be a PTC heater which is operated by receiving power from a battery (not illustrated).

That is, the electric heater 60 heats outside air introduced from the outside by operation of a blow motor and introduces the heated outside air into the vehicle.

In the present exemplary embodiment, the control unit 10 may confirm the outside air temperature, the interior air temperature, and the coolant temperature based on output signals output from the outside air temperature sensor 30, the interior temperature sensor 40, and the coolant temperature sensor 50, and confirm a power consumption prediction value of the electric heater 60.

Herein, as illustrated in FIG. 2, the method of controlling the air conditioning system for the vehicle according to the exemplary embodiment of the present disclosure includes (A) when starting of the vehicle is in an on state, confirming, by the control unit, a heating condition and a waste heat source state while the vehicle travels, and predicting power consumption of the electric heater, and (B) comparing a power consumption reference value of the electric heater with a power consumption prediction value of the electric heater, displaying that economical heating is available or unavailable on the display unit, determining whether to turn off the starting of the vehicle, and terminating the control.

First, in the operation (A), the user starts and operates the vehicle (S10).

Then, the control unit 10 detects the heating condition 20 which the user previously sets or newly sets, and detects a waste heat source state including an outside air temperature, an interior air temperature, and a coolant temperature based on output signals output from the outside air temperature sensor 30, the interior temperature sensor 40, and the coolant temperature sensor 50 (S20).

When the heating condition 20 and the waste heat source state are completely detected, the control unit 10 predicts power consumption of the electric heater 60 according to the detected heating condition 20 and waste heat source state (S30).

Herein, in the predicting of, by the control unit 10, the power consumption of the electric heater 60 according to the detected heating condition 20 and waste heat source state (S30), the control unit 10 may predict the power consumption of the electric heater 60 by using one or two or more waste heat sources among outside air, interior air, and a coolant for heating of the vehicle.

As described above, when the operation (A) is completed, the operation (B) is performed.

Herein, in the operation (B), the control unit 10 determines whether the power consumption reference value of the electric heater 60 is larger than the power consumption prediction value of the electric heater 60 (S40).

In determining whether the power consumption reference value of the electric heater 60 is larger than the power consumption prediction value of the electric heater 60 (S40), when the power consumption reference value of the electric heater 60 is larger than the power consumption prediction value of the electric heater 60, the control unit 10 displays that economical heating is available by illuminating green light on the display unit 70 (S50).

Then, the control unit 10 determines whether to turn off the starting of the vehicle (S70). In determining, by the control unit 10, whether to turn off the starting of the vehicle (S70), when it is determined to turn off the starting of the vehicle, the control unit 10 terminates the control.

On the contrary, in the determining of whether the power consumption reference value of the electric heater 60 is larger than the power consumption prediction value of the electric heater 60 (S40), when the power consumption reference value of the electric heater 60 is not larger than the power consumption prediction value of the electric heater 60, the control unit 10 displays that economical heating is unavailable by illuminating red light on the display unit 70 (S50).

After displaying, by the control unit 10, that the economical heating is unavailable on the display unit 70 (S60) is performed, the determining of, by the control unit 10, whether to turn off the starting of the vehicle (S70) may be performed again. Herein, in determining, by the control unit 10, whether to turn off the starting of the vehicle (S70), when it is determined not to turn off the starting of the vehicle, the method may return to the detecting of, by the control unit 10, the heating condition which the user previously sets or newly sets, and the detecting of, by the control unit 10, the waste heat source state based on the output signals output from the outside air temperature sensor 30, the interior temperature sensor 40, and the coolant temperature sensor 50 (S20).

That is, the method of controlling the air conditioning system according to the present exemplary embodiment may illuminate the green or red light on the display unit 70 while repeatedly performing the respective operations while the vehicle travels, thereby enabling the user to recognize whether the economical heating is available or unavailable in real time.

In the meantime, in the present exemplary embodiment, the control unit 10 predicts the power consumption prediction value of the electric heater in the operation S30, and the control unit 10 compares the power consumption reference value of the electric heater 60 with the power consumption prediction value of the electric heater 60 in the operation S40, but the present disclosure is not limited thereto.

That is, in the operations S30 and S40, the control unit 10 may also predict an expected power consumption rate instead of the power consumption prediction value of the electric heater 60, and compare the reference power consumption rate with the expected power consumption rate of the electric heater 60 and determine a difference between the reference power consumption rate and the expected power consumption rate of the electric heater 60.

Accordingly, when the method of controlling the air conditioning system for the vehicle according to the exemplary embodiment of the present disclosure configured as described above is applied, the method predicts and determines a waste heat source state and power consumption of the electric heater 60 in real time before or during operation of a heating mode of a vehicle in an electric vehicle to enable a user to recognize whether economical heating is available, thereby preventing excessive power consumption of the electric heater 60, and increasing an overall travelling distance of the vehicle through an efficient management of the battery.

Further, the user may confirm whether economical heating is available through the display unit 70 in real time while the vehicle travels, thereby improving marketability of the vehicle.

Further, in the exemplary embodiment of the present disclosure, a waste heat source generated in a vehicle is detected and the waste heat source is selectively used for heating of the interior of the vehicle, thereby efficiently implementing the air conditioning system.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A method of controlling an air conditioning system for a vehicle, the method comprising:
   (A) in a state where starting of the vehicle is in an on state, confirming, by a control unit, a heating condition and a waste heat source state while the vehicle travels, and predicting power consumption of an electric heater; and
   (B) comparing a power consumption reference value of the electric heater with a power consumption prediction value of the electric heater, displaying that economical heating is available or unavailable on a display unit, determining whether to turn off the starting of the vehicle, and terminating a control, which are performed by the control unit.

2. The method of claim 1, wherein the operation (A) includes:
   turning on the starting of the vehicle and driving the vehicle;
   detecting, by the control unit, the heating condition which the user previously sets or newly sets, and detecting, by the control unit, a waste heat source state based on output signals output from an outside air temperature sensor, an interior temperature sensor, and a coolant temperature sensor; and
   predicting, by the control unit, power consumption of the electric heater according to the detected heating condition and waste heat source state.

3. The method of claim 2, wherein:
   in the predicting of, by the control unit, the power consumption of the electric heater according to the detected heating condition and waste heat source state, the control unit predicts the power consumption of the electric heater by using one or two or more waste heat sources among outside air, interior air, and a coolant for heating of the vehicle.

4. The method of claim 1, wherein the operation (B) includes:
   determining of, by the control unit, whether the power consumption reference value of the electric heater is larger than the power consumption prediction value of the electric heater;
   in the determining of, by the control unit, whether the power consumption reference value of the electric heater is larger than the power consumption prediction value of the electric heater, when the power consumption reference value of the electric heater is larger than the power consumption prediction value of the electric heater, displaying, by the control unit, that economical heating is available on the display unit; and
   determining of, by the control unit, whether to turn off the starting of the vehicle.

5. The method of claim 4, further comprising:
   in the determining of, by the control unit, whether the power consumption reference value of the electric heater is larger than the power consumption prediction value of the electric heater, when the power consumption reference value of the electric heater is not larger than the power consumption prediction value of the electric heater, displaying, by the control unit, that economical heating is unavailable on the display unit.

6. The method of claim 5, further comprising:
   after the displaying of, by the control unit, that economical heating is unavailable on the display unit is performed, determining of, by the control unit, whether to turn off the starting of the vehicle again.

7. The method of claim 4, further comprising:
in the determining of, by the control unit, whether to turn off the starting of the vehicle, when it is determined to turn off the starting of the vehicle, terminating the control.

8. The method of claim 4, further comprising:
in the determining of, by the control unit, whether to turn off the starting of the vehicle, when it is determined not to turn off the starting of the vehicle, returning to the detecting of, by the control unit, the heating condition which the user previously sets or newly sets, and detecting, by the control unit, the waste heat source state based on the output signals output from the outside air temperature sensor, the interior temperature sensor, and the coolant temperature sensor in the operation (A).

9. The method of claim 1, wherein:
the display unit is provided in a navigation or full automatic temperature control (FATC) panel mounted inside the vehicle.

10. The method of claim 1, wherein:
when economical heating is available, the display unit is illuminated with green light, and when economical heating is unavailable, the display unit is illuminated with red light to enable the user to recognize whether the economical heating is available or unavailable.

11. A non-transitory computer readable medium containing program instructions executed by a processor, the computer readable medium comprising:
program instructions that, in a state where starting of a vehicle is in an on state, confirm a heating condition and a waste heat source state while the vehicle travels, and predict power consumption of an electric heater; and
program instructions that compare a power consumption reference value of the electric heater with a power consumption prediction value of the electric heater, display that economical heating is available or unavailable on a display unit, determine whether to turn off the starting of the vehicle, and terminate a control.

* * * * *